US010721407B1

(12) United States Patent
Moyes

(10) Patent No.: US 10,721,407 B1
(45) Date of Patent: Jul. 21, 2020

(54) REAL-TIME IMAGE CAPTURE SYSTEM

(71) Applicant: Charles W. Moyes, San Francisco, CA (US)

(72) Inventor: Charles W. Moyes, San Francisco, CA (US)

(*) Notice: Subject to any disclaimer, the term of this patent is extended or adjusted under 35 U.S.C. 154(b) by 0 days.

(21) Appl. No.: 15/273,626

(22) Filed: Sep. 22, 2016

Related U.S. Application Data

(60) Provisional application No. 62/222,400, filed on Sep. 23, 2015.

(51) Int. Cl.
H04N 5/232 (2006.01)
G06T 7/13 (2017.01)
G06T 7/136 (2017.01)
H04N 5/235 (2006.01)
G06K 9/40 (2006.01)
G06K 9/46 (2006.01)

(52) U.S. Cl.
CPC .......... H04N 5/23293 (2013.01); G06K 9/40 (2013.01); G06K 9/4647 (2013.01); G06T 7/13 (2017.01); G06T 7/136 (2017.01); H04N 5/2351 (2013.01); G06K 2209/01 (2013.01); G06T 2207/20024 (2013.01); G06T 2207/20182 (2013.01); G06T 2207/30176 (2013.01)

(58) Field of Classification Search
CPC .......... H04N 5/23212; H04N 5/23209; H04N 5/23293; H04N 5/2351; G03B 13/36; G03B 17/14; G03B 17/20; G03B 13/00; G06T 7/136; G06T 7/13; G06T 2207/20024; G06T 2207/20182; G06T 2207/30176; G06K 9/40; G06K 9/4647; G06K 2209/01

See application file for complete search history.

(56) References Cited

U.S. PATENT DOCUMENTS

| | | | |
|---|---|---|---|
| 2008/0219515 A1* | 9/2008 | Namgoong | G06K 9/0061 382/117 |
| 2012/0147197 A1* | 6/2012 | Hjelmstrom | H04N 5/23212 348/187 |
| 2014/0002673 A1* | 1/2014 | Wu | H04N 17/002 348/187 |
| 2014/0168478 A1* | 6/2014 | Baheti | G06K 9/2081 348/240.99 |
| 2015/0046953 A1* | 2/2015 | Davidson | G06K 9/00758 725/74 |
| 2016/0337578 A1* | 11/2016 | Kikuchi | H04N 5/23212 |

* cited by examiner

Primary Examiner — Luong T Nguyen

(57) ABSTRACT

A method for processing camera images in real-time is disclosed. The user starts a process that generates a feed from a mobile device of camera images of a document. An image from the feed is obtained and set as the current image. One or more of a plurality of aspects regarding the image are computed and tested against a threshold. If the aspect fails to satisfy the threshold, then the user is prompted to change the move the mobile device. Once the aspects satisfy their respective thresholds, the camera feed is stopped, the last image is saved, and character recognition of the last image is performed and displayed to the user.

20 Claims, 2 Drawing Sheets

REAL-TIME IMAGE CAPTURE SYSTEM

CROSS-REFERENCE TO RELATED APPLICATIONS

This application claims the benefit of and priority to U.S. Provisional Application Ser. 62/222,400 filed on Sep. 23, 2015, and titled "A REAL-TIME IMAGE CAPTURE SYSTEM", which provisional application is incorporated by reference in its entirety into the present application.

FIELD OF THE INVENTION

Embodiments relate generally to real-time image processing.

DESCRIPTION OF THE RELATED ART

Character recognition is exceedingly difficult if the document containing the characters is distorted, poorly lit, or out-of-focus. A mechanism is needed to improve the image to better recognize characters contained therein.

BRIEF SUMMARY OF THE INVENTION

Embodiments detect and only submit high-quality images to a backend character recognition web service by using various metrics on the mobile device. In particular, the embodiments provide visual and textual feedback to the user using a mobile phone or tablet output screen to guide the user to improve the image.

Embodiments include a method for processing camera images in real-time, where the method includes starting a process that feeds camera images in real-time, obtaining an image from the real-time feed and setting the obtained image as the current image, for one or more of a plurality of aspects relating to the current image, deriving the image aspect from the current image, testing the image aspect against a threshold for the aspect, determining whether a better image is needed based on the testing of each image aspect against the threshold for the aspect, if a better image is needed, providing feedback to the user to obtain a user adjustment of the camera images. If the current image is acceptable, the method includes stopping the process that feeds the camera images, retaining the last camera image, and performing character recognition of the last image.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1:
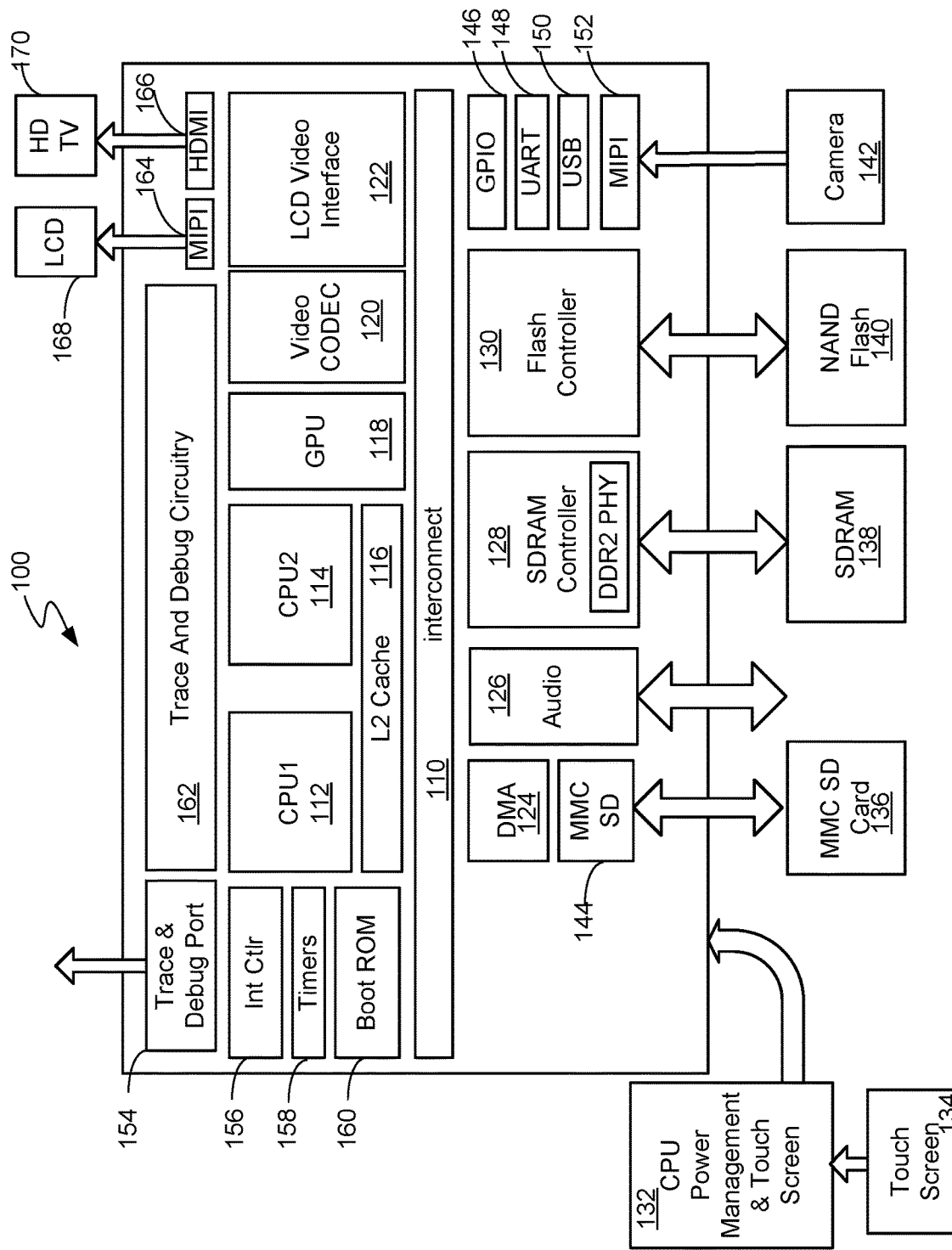
FIG. 1 is an example architecture of a device in which embodiments operate.

FIG. 1 depicts an example architecture of a mobile device 100, such as smart phone or tablet, in which various embodiments operate. The mobile device 100 includes a pair of CPUs 112, 114, coupled to an L2 cache 116, which is coupled to a device level interconnect 110. The device further includes a graphics processing unit (GPU) 118, a video codec, and an LCD Video Interface 122, each of which is coupled to the interconnect 110. In one embodiment, the LCD Video Interface 122 is coupled via a MIPI interface 164 to an LCD screen 168 and via an HDMI interface 166 to an HDTV 170. The LCD screen 168 displays information and provides visual feedback to the user. The device 100 further includes a DMA controller 124, an audio controller 126, an SDRAM controller 128, and a flash controller 130, each of which is coupled to the interconnect 110. The audio controller 126 provides audio for applications and audio feedback to the user. The SDRAM controller 128 is coupled to SDRAM 138. The Flash Controller 130 is coupled to NAND flash memory 140. The device 100 further includes an MMC SD controller 144 that is coupled to an MMC SD card 136, a MIPI interface 152 to an external camera 142, which provides the camera images. The device 100 further includes a general purpose IO device 146, a UART 148, a USB port 150, a Boot ROM 160, Timers 158, an interrupt controller 156, a trace and debug port 154 and trace and debug circuitry 162. Coupled to the device 100 is an additional CPU 132 that performs power management and touch screen functions for a touch screen 134 coupled to the additional CPU 132.

An embodiment includes a program or programs executed by one or both of the CPUs 112, 114, with portions executed by the GPU 118 and contained in the memory 138, the ROM 160, the MMC SD card or other computer readable medium, wherein the program operates to detect various aspects of a camera image obtained from a camera 142 attached to the mobile device 100 and to provide visual feedback via the LCD 168 coupled to the LCD Video Interface 122 and audio feedback via audio interface 126 and a speaker (not shown) to the user. The user adjusts the mobile device 100 based on this feedback to improve the camera image to an acceptable level for one or more of the various aspects of the image.

Included among the aspects of a camera image obtained from camera 142 that are detected are the position of the mobile device 100 with respect to a document, the sharpness and focus of the camera image, the lighting of the camera image, the noise in the image, the framing of the image, and the stroke width uniformity in the image. Included in the visual feedback are visual guidelines, edges, binarized images, a sharpness graph, numerical scores, and messages telling the user how to correct the image quality. Included in the audio feedback are a modulated frequency of a tone to indicate when the image quality is improving or a beep whenever the image quality drops above or below a given quality threshold.

Having the mobile device held in a plane that is normal to the image is important to prevent distortion of the image. To determine the position of the mobile device, an embodiment uses the gyroscope orientation sensors in the mobile device. Thus, perspective distortion in the camera image is eliminated.

Sharpness and focus are essential to obtain recognizable characters. Sharpness and focus are evaluated, in one embodiment, using an edge detection scheme based on Sobel filters and thresholds. The Sobel filter can detect an approximate gradient of the camera image intensity function. In another embodiment, sharpness and focus are evaluated by convolution with a Laplacian filter. For either the Sobel or Laplacian filter, a specific threshold is set to indicate when the sharpness and focus are acceptable.

If the lighting of the camera image is too dark or too bright, then detail in the image is indistinguishable or lost. Lighting of the camera image is detected based on the luminance histogram provided by the mobile device. The histogram is checked for bimodality and separation between luminance peaks. A specific threshold is also provided for the lighting of the image to indicate an acceptable amount of lighting.

Recognition of characters in the image is greatly improved if the noise surrounding the characters is reduced or eliminated. Noise in the camera image is detected using a Fourier technique that looks at the energy spectrum of the image for the $1/f^2$ slopes which characterize natural noise. A noise threshold is provided such that if the image noise is below the threshold, the image is acceptable.

Character recognition is also improved if the camera image does not have parts of words that are incomplete because the image was improperly framed, i.e., the entire document needs to be captured. This may require movement of the mobile device closer to or farther away from the document to be captured. In one embodiment, framing can be detected by edge detection and maximum area contour, in which an area of maximum area contour is larger than a given percentage of the frame area. The detected contour, either foreground or background, can be displayed to the user. A threshold is provided that indicates that the document is adequately framed.

Also important to character recognition in the document is the uniformity of a strokes making up the character. To determine the degree of uniformity, a stroke width transform is performed on the camera image and the widths obtained are checked for such properties as the median and variance. A threshold is provided to indicate whether the stroke width uniformity is acceptable.

In one embodiment, templates of character images help to determine whether the camera image has the correct rotation.

To aid the user in improving the image, a variety of feedback indicators is provided. These include either visual indicators, audio indicators, or both. Embodiments provide visual guidelines, edges of the camera image, a binarized image, a sharpness graph, and numerical scores to help the user. Additionally, embodiments provide an audible tone whose frequency is increased when the image quality improves and whose frequency drops when the image quality deteriorates. Alternatively, the audible signal is a beep that indicates that the image is acceptable or unacceptable.

Figure 2:
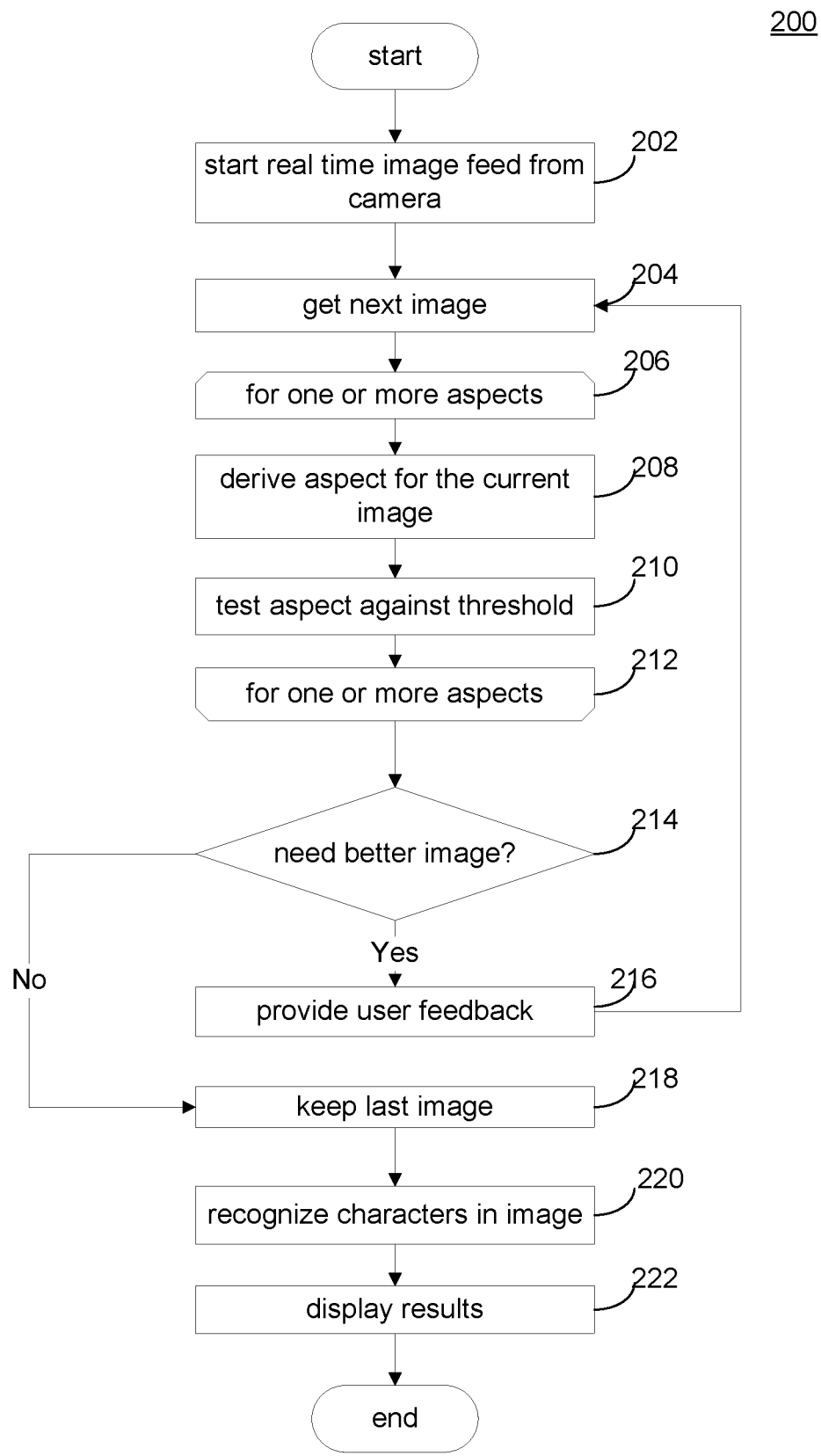
FIG. 2 is a flow chart of the real-time capture and processing steps.

In operation as depicted the flow chart 200 of FIG. 2, the user places the mobile device 100, such as a smart phone, over a document to be captured and starts a camera process that generates a feed of still frames each of which has one or more aspects tested. In step 202 of FIG. 2, the continuous process which captures in real-time still frames of the camera image is started. In step 204, a loop 206, 212 for processing the current frame is started. For the frame one or more aspects of the image are derived, in step 208, and tested, in step 210, against a threshold for that aspect. For example, if the aspect is the sharpness or focus, Sobel filtering is performed and the results tested against a sharpness threshold. In one embodiment, GPU accelerated OpenGL ES pixel shaders are used to quickly perform a task such as Sobel filtering to obtain sharpness information. If, in the process of testing various aspects of the current frame, the system determines that one of the aspects so badly fails to satisfy the threshold, then no more aspects for the image are derived and the loop ends 206, 212. If an aspect satisfies its threshold, then the loop 206, 212 continues onto the next aspect.

The system decides whether a better image is needed in step 214, based on the results from the loop 216, 212. If a better image is needed, then user feedback is provided in step 216, in the form of a visual cue or an audible cue, and the next frame in the feed is processed in step 204. If the image is acceptable, then the feed is stopped, the last image is kept, in step 218, and characters in the image are then processed in step 220. The character processing can be performed locally by the mobile device 100 or remotely by a service, such as a Web service, requested by the remote device. The results are displayed on the mobile device in step 222.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method for processing camera images in real-time, the method comprising:
    starting a process that feeds the camera images in real-time;
    obtaining an image from the real-time feed and setting the obtained image as a current image; and
    deriving at least one image aspect from the current image, wherein deriving the at least one image aspect includes determining a maximum area contour of the current image; and
    testing the at least one image aspect against a threshold for the at least one image aspect, wherein the threshold is a given percentage of a frame area;
    determining that a better image is needed when the maximum area contour of the current image exceeds the given percentage of the frame area;
    when the better image is needed, providing feedback to a user to obtain a user adjustment of the camera images by the user moving a camera; and
    when the current image has a maximum area contour that does not exceed the given percentage of the frame area, stopping the process that feeds the camera images, retaining a last camera image, and performing character recognition of the last camera image.

2. The method of claim 1, wherein the at least one image aspect further includes one of sharpness, focus, lighting, noise, or stroke width uniformity.

3. The method of claim 2, wherein the sharpness is determined by Sobel filtering the image.

4. The method of claim 2, wherein the lighting is detected based on a luminance histogram.

5. The method of claim 2, wherein the noise is detected based on a Fourier analysis of an energy spectrum of the image.

6. The method of claim 2, wherein the sharpness is determined by convolution with a Laplacian filter.

7. The method of claim 2, wherein the stroke width uniformity is determined by a stroke width transform performed on a camera image.

8. A computer readable, non-transitory storage medium having stored therein a computer program for processing camera images in real-time, wherein a computer system executing the computer program carries out the steps of:
    starting a process that feeds the camera images in real-time;
    obtaining an image from the real-time feed and setting the obtained image as a current image; and
    deriving at least one image aspect from the current image, wherein deriving the at least one image aspect includes determining a maximum area contour of the current image; and testing the at least one image aspect against a threshold for the at least one image aspect wherein the threshold is a given percentage of a frame area;

determining that a better image is needed when the maximum area contour of the current image exceeds the given percentage of the frame area;

when the better image is needed, providing feedback to a user to obtain a user adjustment of the camera images by the user moving a camera; and when the current image has a maximum area contour that does not exceed the given percentage of the frame area, stopping the process that feeds the camera images, retaining a last camera image, and performing character recognition of the last camera image.

9. The computer readable, non-transitory storage medium of claim 8, wherein the at least one image aspect further includes one of sharpness, focus, lighting, noise, or stroke width uniformity.

10. The computer readable, non-transitory storage medium of claim 9, wherein the sharpness is determined by Sobel filtering the image.

11. The computer readable, non-transitory storage medium of claim 9, wherein the lighting is detected based on a luminance histogram.

12. The computer readable, non-transitory storage medium of claim 9, wherein the noise is detected based on a Fourier analysis of an energy spectrum of the image.

13. The computer readable, non-transitory storage medium of claim 9, wherein the sharpness is determined by convolution with a Laplacian filter.

14. The computer readable, non-transitory storage medium of claim 9, wherein the stroke width uniformity is determined by a stroke width transform performed on a camera image.

15. A computer system comprising:
a processor;
memory;
a liquid crystal display (LCD) video interface;
an interface to a camera; and
an interconnect that couples the processor, memory, and LCD video interface to each other;
wherein the memory contains instructions that direct the processor to:

start a process that feeds images from the camera interface in real-time;

obtain an image from the real-time feed and set the obtained image as a current image; and derive at least one image aspect from the current image, wherein deriving the at least one image aspect includes determining a maximum area contour of the current image; and test the at least one image aspect against a threshold for the at least one image aspect, wherein the threshold is a given percentage of a frame area;

determine that a better image is needed when the maximum area contour of the current image exceeds the given percentage of the frame area;

when the better image is needed, provide feedback to a user via the LCD video interface to obtain a user adjustment of the images by the user moving a camera; and when the current image has a maximum area contour that does not exceed the given percentage of the frame area, stop the process that feeds the images from the camera, retain a last camera image, and perform character recognition of the last camera image.

16. The system of claim 15, wherein the at least one image aspect further includes one of sharpness, focus, lighting, noise, or stroke width uniformity.

17. The system of claim 16,
further comprising a graphics processing unit (GPU) coupled to the interconnect;
wherein the sharpness is determined by the GPU performing Sobel filtering on the image.

18. The system of claim 16, wherein the lighting is detected based on a luminance histogram.

19. The system of claim 16, wherein the noise is detected based on a Fourier analysis of an energy spectrum of the image.

20. The system of claim 16, wherein the stroke width uniformity is determined by a stroke width transform performed on the image from the camera.

* * * * *